United States Patent [19]

Serfaty et al.

[11] Patent Number: 4,651,026
[45] Date of Patent: Mar. 17, 1987

[54] CLOCK RECOVERY CIRCUIT

[75] Inventors: Salomon Serfaty, Doar Gaash; Mordechay Cohen, Giv'Atayim, both of Israel

[73] Assignee: Motorola, Inc., Schaumburg, Ill.

[21] Appl. No.: 619,666

[22] Filed: Jun. 11, 1984

[30] Foreign Application Priority Data

Jul. 6, 1983 [GB] United Kingdom ................ 8318296

[51] Int. Cl.$^4$ ........................ H03D 3/24; H04L 25/34
[52] U.S. Cl. .................................. 307/269; 307/474; 328/63; 328/72; 375/120
[58] Field of Search .................... 328/63, 72; 375/120, 375/115; 307/474, 269, 527

[56] References Cited

U.S. PATENT DOCUMENTS 4,339,823  7/1982  Predina et al. ...................... 375/120

Primary Examiner—Stanley D. Miller
Assistant Examiner—Richard Roseen
Attorney, Agent, or Firm—Donald B. Southard; Charles L. Warren

[57] ABSTRACT

The invention provides a clock recovery circuit for deriving a recovered clock signal from the band limited multi-level digital signal. The multi-level digital signal is compared with a number of reference levels in a bank of comparators whose outputs are combined to provide a marking signal indicative of threshold crossings by the multi-level signal. The marking signal consists of groups of transition markers separated by eye intervals. A signal source provides clock pulses and window pulses with the window pulses being synchronized with the eye intervals to provide a recovered clock signal.

The invention may be implemented entirely in digital form and is particularly suitable for use in partial response signalling in which band limited multi-level digital signals are transmitted without additional clock signals. Performance may be further enhanced by utilizing a smoothing phase locked loop to provide a smoothed clock signal.

17 Claims, 9 Drawing Figures

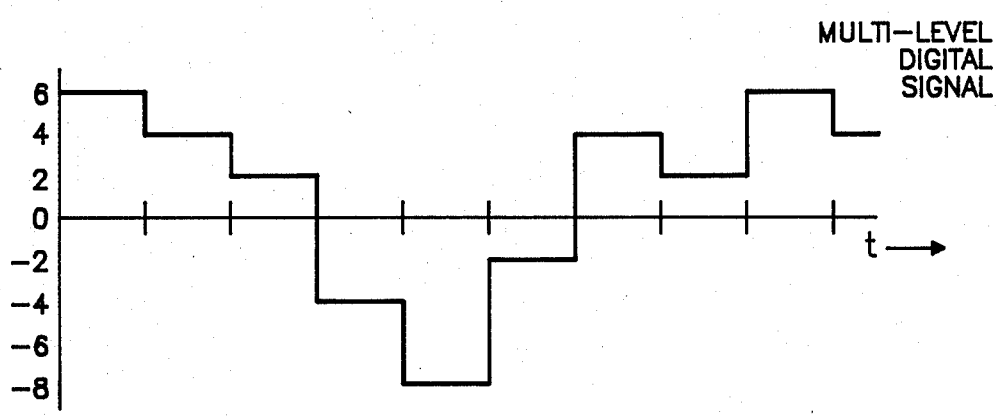
Fig. 1a
Fig. 1b
| 1st DATA STREAM | 2nd DATA STREAM | 3rd DATA STREAM | LEVEL |
|---|---|---|---|
| 1 | 1 | 1 | 6 |
| 1 | 1 | 0 | 4 |
| 1 | 0 | 1 | 2 |
| 1 | 0 | 0 | 0 |
| 0 | 1 | 1 | −2 |
| 0 | 1 | 0 | −4 |
| 0 | 0 | 1 | −6 |
| 0 | 0 | 0 | −8 |
Fig. 2
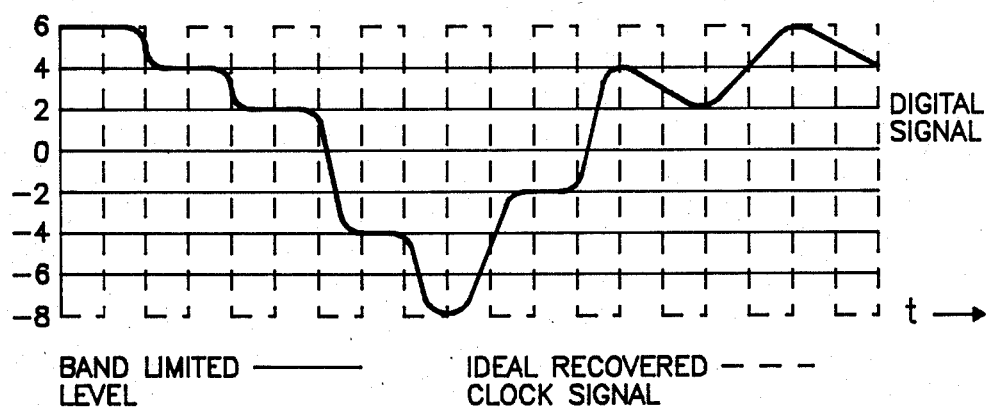

CLOCK RECOVERY CIRCUIT

TECHNICAL FIELD

The invention relates to a clock recovery circuit and in particular to a circuit for deriving a clock signal from a band limited multi-level digital signal.

BACKGROUND ART

Digital signals are conventionally transmitted through various media, such as hard-wire lines and radio links. They are transmitted at a certain rate or frequency. For decoding these signals upon reception, the frequency and phase of the originally transmitted signal must be recovered. The recovered clock is applied to a sampling circuit where it determines the rate at which this circuit samples the pulses comprising the received signal.

When the digital signal is pure binary, generating a recovered signal from the received digital signal is relatively simple. A pure binary signal is comprised of non-band-limited square wave-like signals with the high portion of the square wave representing a logic one and the low-portion—a logic zero. Although the leading edge of the pulse of the recovered clock does not begin in the middle of each bit of the binary signal but may vary by as much as ±90°, the timing of the recovery clock is still adequate for instructing a decoder when to sample the bits of the incoming pure binary digital signal.

The transmission of a pure binary digital signal requires a substantial bandwidth and therefore it is usually preferable to transmit a band-limited digital signal. Moreover, for more efficient data transmission, it is desirable to transmit more than one stream of data on a single digital signal. A digital signal having more than two logic levels, i.e., more than one data stream of logic ones and logic zeros, is a multi-level digital signal. To reduce the occupied bandwidth, the multi-level digital signal is band-limited. To recover the original data streams from the band-limited multi-level digital signal, either the leading or the trailing edges of the recovered clock pulses which time the sampling circuit must ideally begin at the centre of each multi-level digital bit to ensure that none of the incoming information is lost.

A clock signal may be recovered from the transmitted multi-level signal by means for square law extraction using adjustable LC filters. Such filters are complex and costly, require initial adjustment and their responses are inclined to drift with time and temperature.

This invention seeks to provide a clock recovery circuit for deriving clock signals from band-limited multi-level digital signals in which no clock information is included, and in which the above mentioned disadvantages are mitigated.

According to the present invention there is provided a clock recovery circuit for deriving a clock signal from a band-limited multi-level digital signal, the circuit comprising means responsive to the multi-level digital for deriving a marking signal comprising groups of transition markers each marker corresponding to the crossing by the digital signal of any of a plurality of predetermined threshold levels and adjacent groups of markers being separated by an eye interval during which no transitions take place; a signal source for providing clock pulses and window pulses and means for synchronizing the window pulses with the eye intervals to provide the recovered clock signal.

The means for deriving the marking signal may include a plurality of comparators each for comparing the multi-level digital signal with any of a plurality of threshold levels and for providing an output level change indicative of the crossing of any of the plurality of threshold levels by the digital signal.

Gating means may be provided for combining outputs of the comparators into a single output.

A differentiator may be provided for differentiating logic level changes at the single output of the gating means, to provide the marking signal.

The signal source may comprise an oscillator whose output signal is fed to clock a feedback connected shaft register operative to divide the oscillator output signal to produce a train of window pulses each of predetermined width and of a repetition frequency substantially corresponding to that of the eye intervals.

The means for synchronizing the window pulses with the eye intervals may conveniently comprise means for comparing the window pulses fed from the signal source with the marking signal and for providing a synchronization indicating output signal; and synchronization adjustment means for adjusting the phase and the window pulses provided by the signal source in dependence upon the indication of the synchronization indicating output signal.

The synchronization adjustment means may conveniently comprise a flip-flop circuit having an output whose state is set in dependence upon the indication of the synchronization indicating output signal, the output of the flip-flop circuit being coupled to a control signal input of the signal source to provide adjustment of the phase of the window pulses provided by the signal source.

Advantageously smoothing means may be provided for smoothing phase jitter present in the recovered clock signal.

In an embodiment of the invention the smoothing means comprises a phase locked loop circuit including a controllable oscillator for providing a smooth clock signal; a phase comparator for comparing the phase of the clock pulses with that of the smoothed clock signal and for providing a control signal for the controllable oscillator.

Means may be provided responsive to the locking condition of the phase locked loop circuit for controlling the means for synchronizing the window pulses to reduce further any phase jitter present in the recovered clock signal.

An exemplary embodiment of the invention will now be described with reference to the drawings in which;

FIGS. 1a and 1b are explanatory diagrams for a multi-level digital signal consisting of three data streams.

FIG. 2 is a wave form diagram illustrating the band limited digital signal and an ideal recovered clock signal related thereto.

In order to achieve efficient data transmission it is desirable to transmit more than one stream of data on a single digital signal. Such a digital signal having more than two logic levels is a multi-level digital signal. FIG. 1a illustrates an eight level signal which may be used for the transmission of three separate data streams, each of the eight levels representing a unique combination of the bits in the three streams. The assignment of bit combinations to particular logic levels in the multi-level digital signal is illustrated in the table which is also shown in FIG. 1b, beneath the multi-level digital signal waveform shown in FIG. 1a. As can be seen level 6 represents a situation in which the bit in each data stream is at logical one, whilst level 0 represents a one in a first data stream and a logical 0 in each of the second and third streams. The table shows all the possible combinations of bits in the three streams and their associated levels in the multi-level digital signal.

In order to reduce spectral consumption, the square wave type digital signal illustrated in FIG. 1a is band limited which has the effect of rounding the corners of the waveform. Such a band limited signal is illustrated by the solid line waveform of FIG. 2.

In order to be able to decode the multi-level digital signal to recover the transmitted information it is necessary to have a clock signal which, by means of decoding circuitry, may be synchronized to the incoming digital signal. It is desirable not to add clock information to the transmitted multi-level digital signal since this reduces the spectral bandwidth available for the transmission of information. Therefore in such cases, it is necessary to provide a clock recovery circuit that is capable of recovering or deriving clock signals from the band limited multi-level digital signal which does not itself contain clock information.

An ideally phased recovered clock signal is indicated by the dotted line waveform of FIG. 2 which has been superimposed on the multi-level band limited digital signal. In this ideal case the leading transitory edge of each clock pulse of the recovered clock signal begins at the middle of each bit of information comprising the multi-level digital signal. The various threshold levels i.e. the analogue potential levels of the logic levels of the multi-level signal are marked alongside the waveforms and are illustrated by the horizontal lines in the waveform diagram.

Figure 3:
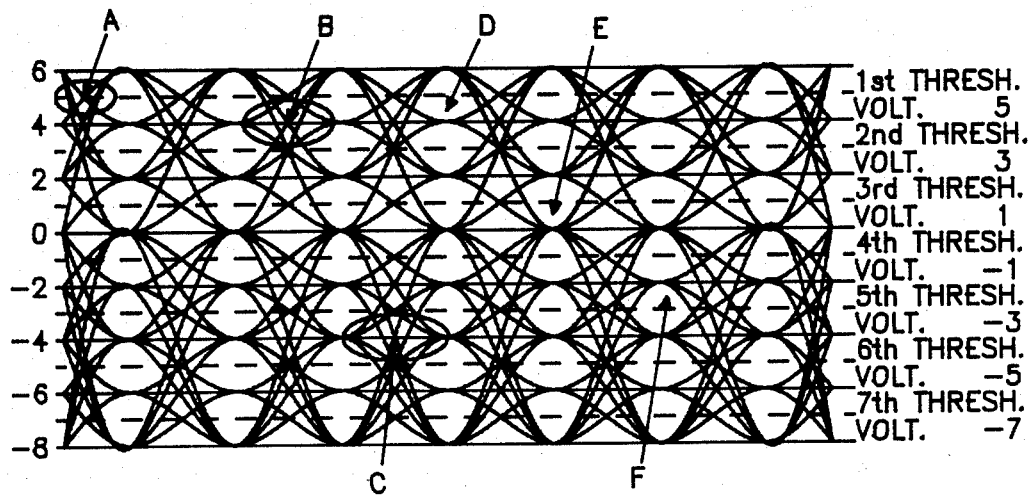
FIG. 3 is an eye pattern for a multi-level digital signal.

As the information contained in the multi-level digital signal changes with time, so the logic level of the signal itself will change and different threshold levels corresponding to the various logic levels of the digital signal will be crossed. FIG. 3 is a graph showing all possible transitions of an eight level band limited digital signal over several bit intervals.

Several groups of threshold crossings may be observed such as those indicated at A, B, and C the term "threshold crossing" indicating the slicing or passing through a threshold level by the digital signal as it varies in magnitude from one logic level to another.

It can also be seen in the graph that several eyes such as illustrated at D, E, and F are formed along each threshold level. The eyes represent portions of the threshold levels during which no threshold crossing occured and are designated as such due to their apparent geometric shape.

The time interval during which an eye occurs is referred to as an eye interval and the centres of the eye intervals correspond to the points in time which are the centres of the respective transmitted bits of the eight level signal. Consequently, in order to achieve optimum sampling and decoding of the multi-level signal the leading transitory edges of the recovered clock pulses should correspond in phase to the centre of each respective eye interval.

Figure 4:
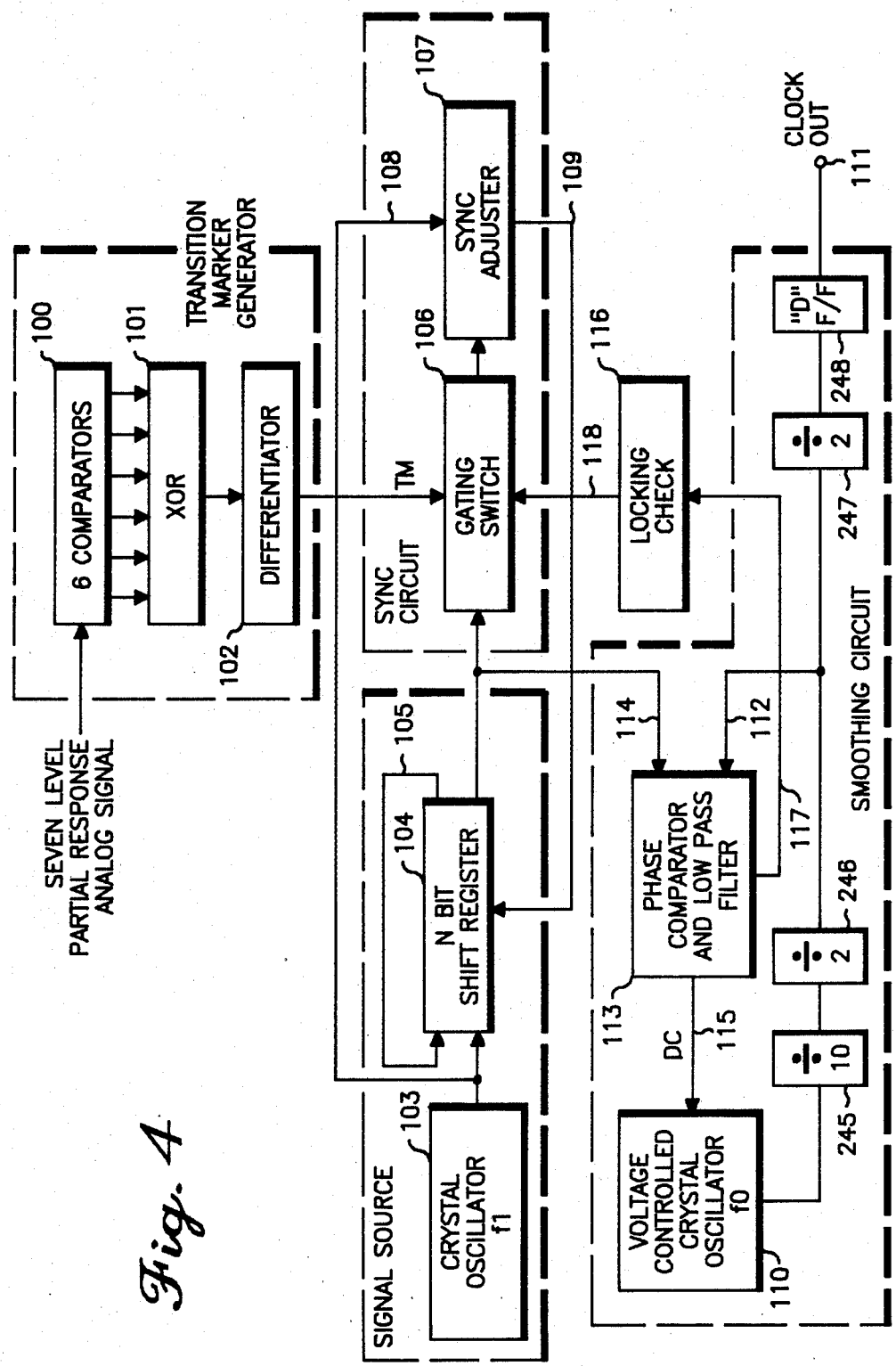
FIG. 4 is a schematic block diagram of a clock recovery circuit in accordance with the present invention.

Referring now to FIG. 4 there is illustrated an embodiment of a clock recovery circuit in accordance with the present invention. This embodiment although applicable to any multi-level band limited digital signal is illustrated particularly for a seven level partial response signal in which six thresholds are required to recover and decode the original data.

The seven level partial response signal is fed in parallel to a bank of six comparators 100 where it is compared with each of six different thresold voltages. Each time the seven level signal crosses a threshold a change in level will occur at the output of a respective comparator. The outputs of the comparators 100 are all coupled to an exclusive OR circuit 101 where they are combined into a single output. Consequently, each time there is a change in output level at the output of any one of the comparators 100 there will be a change in level at the combined output of the exclusive OR circuit 101.

The changes in logic level at the output of the exclusive OR circuit 101 are fed through a differentiator 102 which provides a narrow pulse output corresponding to every change of logical level at its input. The differentiator 102 therefore provides transition markers which are narrow pulses marking the transition of the multi-level signal from one logic level across a threshold to another level. In accordance with the graph shown in FIG. 3 the differentiator 102 will therefore provide narrow output pulses which are arranged in groups with adjacent groups being separated by an interval corresponding to the eye interval in which there is no change in the logic level of the multi-level signal.

Let the time period between the middles of the intervals separating the groups of transition markers provided by the differentiator 102 be denoted by T. Let $\tau$ denote the time interval between adjacent groups of transition markers. This interval depends upon the multi-level signal, the number of levels, intersymbol interference and the bandwidth of the multi-level signal. Let an integer N be chosen such that $N > (T/\tau)$. The choice of N is not critical but for easy implementation the smallest value of N may be chosen that fulfills the above condition. A crystal oscillator 103 is provided having a fixed frequency slightly higher (typically 0.2%) than N times the frequency of the clock signal to be recovered. In other words, $f_1$ is approximately equal to $(1.02N/T)$.

Figure 5:
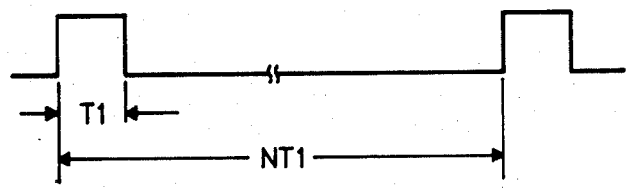
FIGS. 5 and 6 are explanatory diagrams.

The oscillator 103 clocks a N bit shift register 104 which has a feedback connection 105 and operates to divide the frequency of the oscillator 103 so that a pulse of width $T1 = (1/f_1)$ passes through the register to its end and returns. In the absence of any further controls the oscillator 103 and the shift register 104 together will constitute a signal source which produces clock pulses each of width T1 with a repetition period NT1. This is illustrated in FIG. 5 of the drawings. When suitably synchronized with the interval between the groups of transition markers provided by the differentiator 102, the pulses provided by the shift register 104 constitutes a recovered clock signal.

Each output pulse provided by the shift register 104 may conveniently be designated as a window and a synchronization circuit is provided which checks whether a transition marker occurs at the output of the differentiator 102 during the period that the window is open, i.e. during the period in which an output pulse is present at the output of the shift register 104.

If there is no transition marker the window is closed to be opened again during the next cycle after a period NT1. If a transition marker does exist the window is not closed but rather the clocking of the shift register 104 is adjusted so that the location of the window effectively moves. The window is moved until it encounters an empty space corresponding to the eye interval between groups of transition markers.

Figure 6:
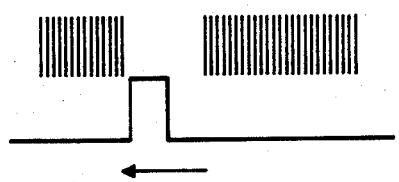

Since the frequency at the output of the shift register 104 is slightly higher than that of the empty space between the groups of transition markers, the window will effectively more to the left relative to the transition markers in the absence of any adjustment to the shifting of the shift register. This is illustrated in FIG. 6 of the drawings.

The synchronization circuit includes a gating switch 106 for comparing the window pulses with the marking signal and a synchronization adjuster 107. The gating switch 106 receives the window pulses provided by the shift register 104 and also is connected to the output of the differentiator 102. The window pulse provided acts to enable the gating switch 106 so that during the time that the window appears the gating switch passes the transition markers to the synchronization adjuster 107.

The synchronization adjuster 107 is clocked by the oscillator 103 by means of a clock input 108 which is coupled to the output of the oscillator. When the gating switch 106 passes transition markers to the synchronizationadjuster 107, the adjuster 107 controls the shifting of the shift register 104 through a control line connection 109. This control signal is in synchronism with the clocking of the shift register 104 since the oscillator 103 clocks both the shift register 104 and the synchronization adjuster 107.

The clocking of the shift register 104 will therefore be adjusted so that the window pulses provided at its output are located within the eye interval between the groups of transition markers which are produced by the differentiator 102, and the train of window pulses will therefore constitute a recovered clock signal.

Any jitter present in the recovered clock signal provided by the shift register 104, due to the phase adjustment of the shifting of the register, may be removed by a smoothing arrangement which in a preferred embodiment of the present invention is provided by a phase locked loop circuit consisting of a voltage controlled oscillator and a phase comparator having a low pass filter.

A voltage controlled oscillator 110 provides a smoothed recovered clock signal at an output terminal 111. The smoothed clock signal is fed to one input 112 of a phase comparator and low pass filter circuit 113 whose second input 114 is fed with the recovered clock signal from the output of the shift register 104. Any phase error between the signals at the inputs 112 and 114 of the phase comparator 113 results in a control signal being fed over line 115 to control the frequency of the voltage controlled oscillator 110.

The phase comparator 113 may usefully be of a type which provides an indication of its locking condition. A locking check circuit 116 receives the locking condition indication over a connection 117 and provides an additional control input to the synchronization circuit in order to reduce phase jitter of the window pulses and hence the recovered clock signal provided at the output of the shift register 104. This additional control input is fed over connection 118 to an additonal input of the gating switch 106 and is effective to reduce the period to time during which the switch 106 passes transition markers to the synchronization adjuster 107. This action effectively reduces the width of the window pulses and causes an additional reduction in phase jitter.

Figure 7A:
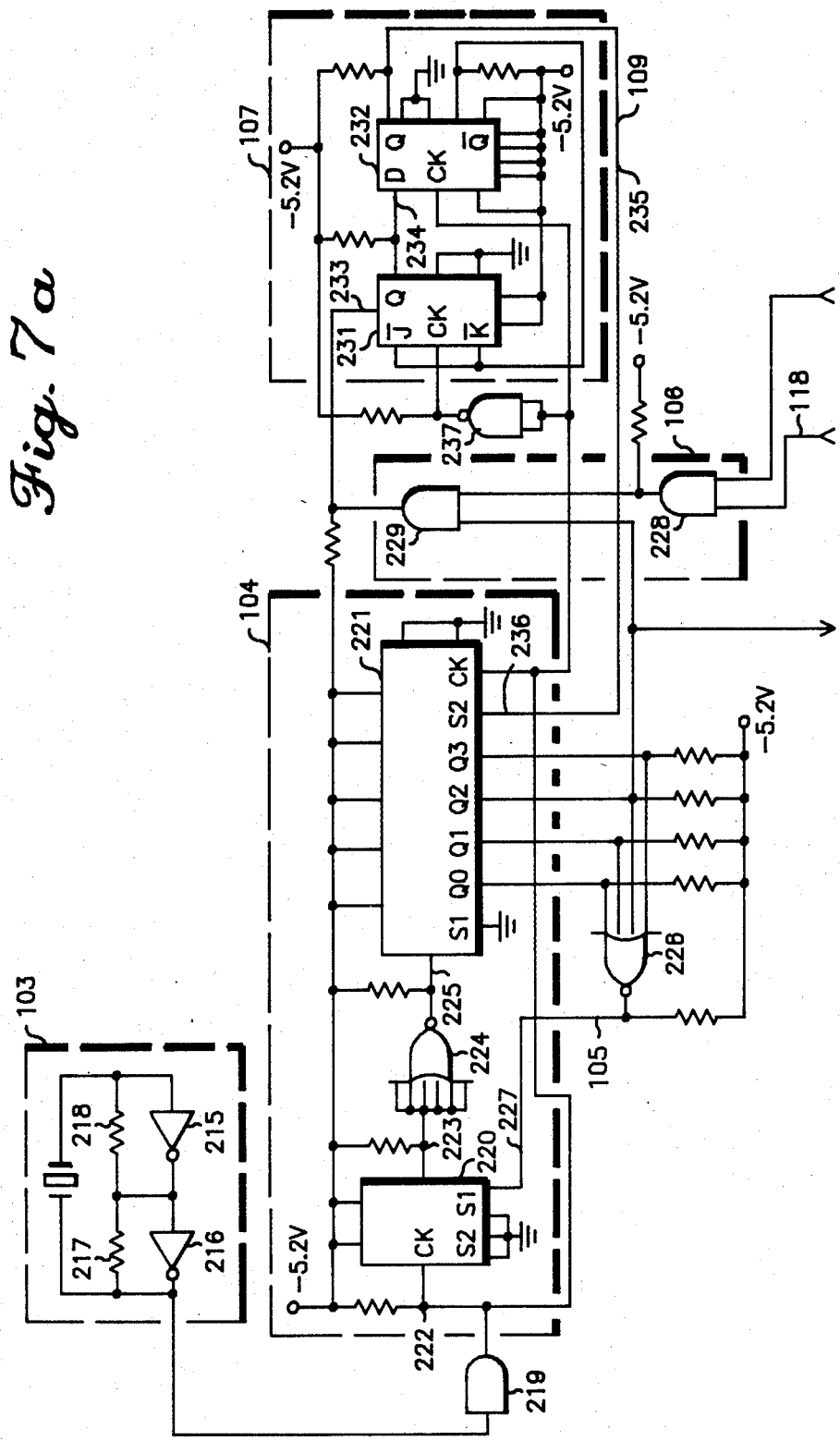
FIGS. 7a, 7b is a more detailed diagram of the embodiment illustrated in FIG. 4.
Figure 7B:
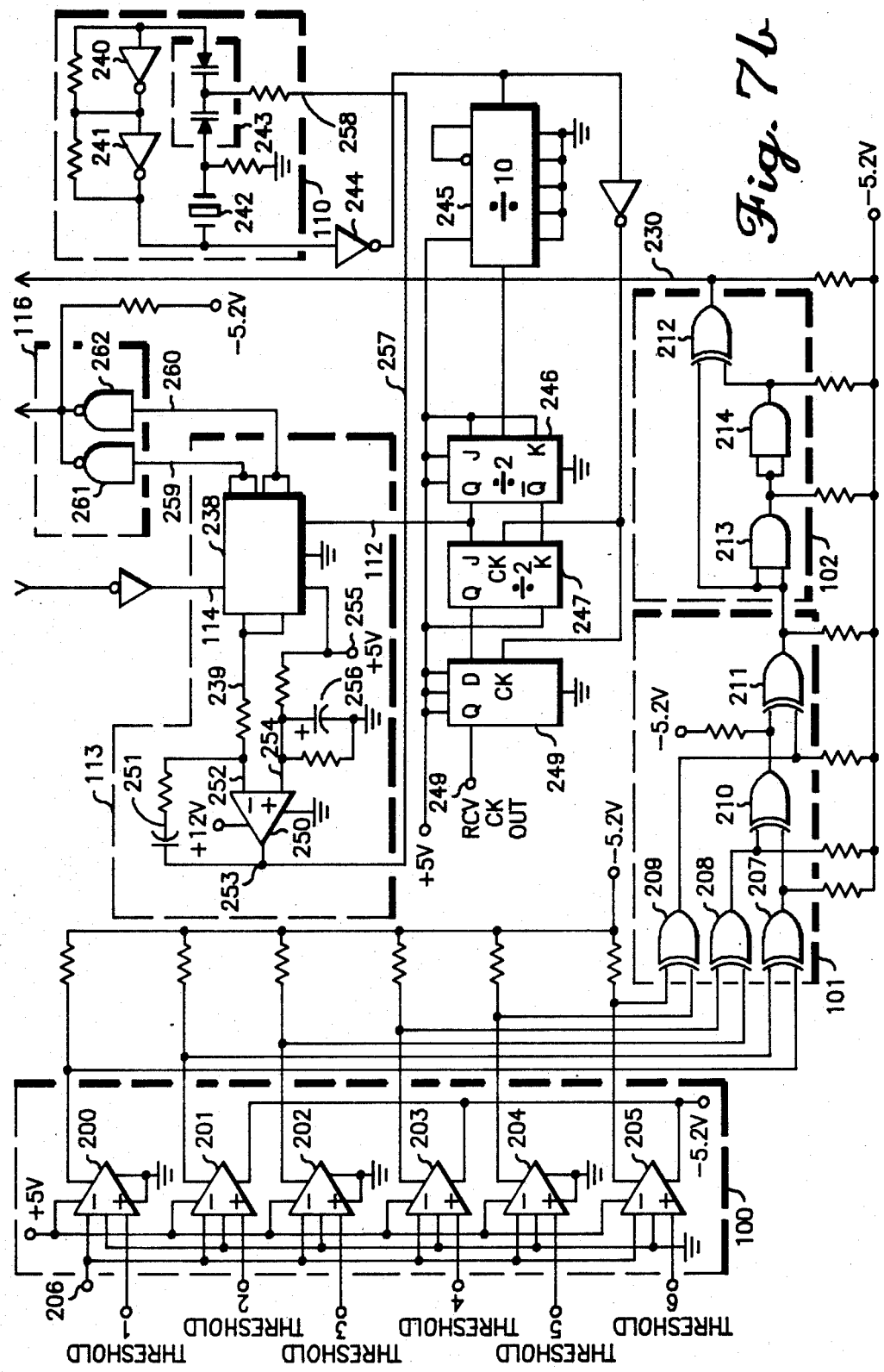

In FIG. 7a, 7b, there is shown a more detailed version of the block diagram of FIG. 4 with like parts in FIGS. 4 and 7a, 7b bearing like reference numerals. The arrangement of FIG. 7a, 7b is conveniently formed using commercially available integrated circuits.

The comparators 100 comprise six comparators 200, 201, 202, 203, 204 and 205. The multi-level signal is fed to an input terminal 206 and then to respective first input terminals of each of the comparators 200, 205 whilst a second input of each comparator receives a different threshold voltage level. The comparators 200 and 201 together may conveniently be formed by a single Motorola MC1650 integrated circuit. In similar manner the comparators 202 and 203 together and the comparators 204 and 205 together may be formed by MC1650 integrated circuits.

Outputs of the comparators 200 and 201 are connected to respective inputs of an exclusive OR gate 207. Outputs of the comparators 202 and 203 are connected to respective inputs of an exclusive OR gate 208, whilst in similar manner outputs of comparators 204 and 205 are connected to respective input of an exclusive OR gate 209.

Outputs of the exclusive OR gates 207 and 208 are connected to respective inputs of a further exclusive OR gate 210 whose output is connected to one input of an exclusive OR gate 211, a second input of the gate 211 being connected to the output of the gate 209. The exclusive OR gates 207 to 211 together form the exclusive OR circuit 101 and the output of the gate 211 constitutes the combined output of the exclusive OR circuit 101.

The differentiator 102 is provided by an exclusive OR gate 212 having one input connected directly to the output of the gate 211 and a second input connected to the output of the gate 211 via a delay circuit. The delay circuit is formed by two serially connected AND gates 213 and 214, the output of the gate 211 being connected in parallel to both inputs of the AND gate 213, whilst the output of the AND gate 213 is connected to both inputs of the AND gate 214. The output of the gate 214 provides the second input of the exclusive OR gate 212.

The gate 212 will therefore produce a narrow pulse only during the period when pulses fed to its two inputs do not overlap and therefore in conjunction with the delay formed by the gates 213 and 214 acts to differentiate the output of the exclusive OR gate 211 to provide the transition markers for the gating switch 106. In the described embodiment the exclusive OR gates 207, 208 and 209 together and the gates 210, 211 and 212 together are formed by Motorola MC10107 integrated circuits whilst the AND gates 213 and 214 are together formed by a Motorola MC10104.

The oscillator 103 which forms part of the signal source comprises two serially connected inverters 215 and 216 typically formed by a Motorola SN74LS04. A resistor 217 is coupled between the output of the inverter 216 and its input whilst a resistor 218 is coupled between the output of the inverter 215 and its input. A crystal which is the present example has a frequency of 15.47 MHz is connected between the output of the inverter 216 and the input of the inverter 215. Output of the oscillator is taken from the output of the inverter 216 and is fed via a logic converter 219 which may be a Motorola MC10124 to clock the N bit shift register.

The N bit shift register consists of a hexadecimal counter 220, typically a Motorola MC10136, and a four bit shift register 221, typically a Motorola MC10141, making N equal to 20 in the present example. The output of the converter 219 is connected to the clock input 222 of the counter 220 the carry output 223 of which is inverted by means of a NOR gate 224 typically a Motoroal MC10109, and fed to data input 225 of the shift register 221.

The shift register feedback 105 is provided by connecting Q0, Q1, Q2 and Q3 output stages of the shift register 221 to respective inputs of a NOR gate 226 provided by the same integrated circuit as the gate 224 and whose output is connected to count control input 227 of the counter 220. The Q2 output of the shift register 221 provides the output of the N bit shift register 104 for connection to the gating switch 106.

The gating switch 106 is formed by two AND gates 228 and 229. The Q2 output of the four bit shift register 221 is connected to one input of the gate 229 which receives as a second input the output of the AND gate 228. The output of the gate 212 which provides the marking signal is connected over line 230 to one input of the AND gate 228 whose second input connection will be described later.

Assuming for the moment that the second input of the AND gate 228 is enabled, the marking signal fed over the line 230 will pass through the AND gate 228 and will appear at an input of the gate 229. During the presence of the window pulse fed to the gate 229 from the Q2 output of the four bit shift register 221, the AND gate 229 will be enabled and will pass to its output the transition markers which form part of the marking signal.

The transition markers fed through the AND gate 229 are fed to the synchronization adjuster 107 which consists of flip-flops 231 and 232. The flip-flop 231 is a JK flip-flop having an asynchronous set input 233 to which the output of the AND gate 229 is connected. The flip-flop 232 is a D-type flip-flop whose D input 234 is connected to the Q output of the flip-flop 231. The Q output of the D-type flip-flop 232 is coupled back by a connection 235 previously denoted 109 in FIG. 4, to control input 236 of the four bit shift register 221. The $\overline{Q}$ output of the D-type flip-flop 232 is fed in parallel to the J and K inputs of the J and K flip-flop 231. The output of the oscillator 103 clocks both the flip-flops 231 and 232, the JK flip-flop 231 being clocked in antiphase to the flip-flop 232 by virtue of an inverter gate 237. The JK flip-flop 231 may typically be formed by a Motorola MC10135 whilst the D-type flip-flop 232 may be a Motorola MC10131.

Each time that a transition marker occurs during the window pulse provided by the N bit shift register the set input 233 of the JK flip-flop 231 will go high and this high will be transferred to the Q output of the JK flip-flop. The D-type flip-flop takes the state of the Q output of the flip-flop 231 at its D input 234 and synchronizes this with the output of the oscillator 103. Consequently, when next the D-type flip-flop is clocked after the Q output of the flip-flop 231 has gone high, the Q output of the D-type flip-flop 232 will also go high.

This high state at the output of the flip-flop 232 is fed to the control input 236 of the four bit shift register and acts to stop the shifting of this shift register for one cycle. This has the effect of moving the window pulse to the right in relation to the marking signal. Because of the connection between the $\overline{Q}$ output of the flip-flop 232 and the J and K inputs of the J and K flip-flop 231 the next pulse which clocks this JK flip-flop will cancel the high level at the Q output of the JK flip-flop is readiness for the next transition marker to arrive at the set input 233.

Consequently, the four bit shift register 221 is controlled by the synchronization adjuster 107 formed by the flip-flops 231 and 232 so that the window pulse is synchronized with the eye interval between groups of transition markers in the marking signal to provide a recovered clock signal.

In order to smooth the recovered clock signal, a phase locked loop circuit is used. The phase locked loop circuit includes a phase comparator 238 which receives at its first input 114 the recovered clock signal resulting from synchronizing the window pulse being fed from the Q2 output of the four bit shift register 221 and at its second input 112 a smoothed clock signal fed from the voltage controlled oscillator circuit 110.

The phase comparator 238 provides at an output 239 an indication of any phase difference between the recovered and smoothed clock signals.

The voltage controlled oscillator circuit 110 includes an oscillator formed by a pair of series connected inverters 240 and 241. Between the output of the inverter 241 and the inverter 240 is connected in series a crystal 242 of frequency typically 15.44 MHz and a varactor control unit 243 typically a MVAM2 integrated circuit. Output of the oscillator is connected via an inverter 244 through a divide by 10 circuit 245 typically formed by a Motorola SN74LS90 and through a divide by 2 circuit 246 formed by a Motorola SN74LS73. The output of the divide by 2 circuit 246 provides the input 112 of the phase comparator 238.

A further divider 247 also comprising a Motorola SN74LS73 divides the output of the divider 246 again by 2 and has its Q output connected to the data input of a final D-type flip-flop 248 whose Q output provides a smoothed recovered clock signal output at an output terminal 249.

The output 239 of the phase comparator 238 is coupled to one input 254 of an operational amplifier 250 formed by a Motorola MC4741. A series connected resistor capacitor combination 251 is connected between input 252 and output 253 of the operational amplifier whilst a second input 254 of the operational amplifier receives a reference potential applied in operation to a terminal 255. A parallel resistor capacitor combination 256 is connected between the input terminal 254 of the operational amplifier and earth reference potential.

The operational amplifier 250 and associated components form an amplifier and low pass filter and in the absence of phase equality between input signals to the phase comparator 238 provides at its output 253 a control signal for adjusting the frequency of the oscillator. This control signal is fed via a connecting line 257 to control input 258 of the varactor control circuit 243 of the oscillator, thereby controlling the oscillator to keep the recovered and smoothed clock signals in phase lock with one another.

The phase comparator 238 has additional outputs 259 and 260 which provide an indication of the locking condition of the phase comparator 238. The outputs 259 and 260 are connected via inverters 261 and 262 respectively to the second input of the AND gate 228.

The outputs 259 and 260 of the phase comparator 237 provide narrow pulses when the phase locked loop is in a locked condition. The AND gates 228 and 229 effectively form a three input AND gate, in which the marker signal is passed through the gate not only in dependence upon the presence of the window pulse provided by the four bit shift register 221, but also in dependence upon the locking condition of the phase locked loop thereby effectively reducing the width of the window during which the marking signal is passed and reducing phase jitter in the recovered clock signal.

It must be understood that the invention has been described by way of example and modifications may be made without departing from the scope of the invention. In particular the embodiment of FIG. 7a, 7b has been described with reference to the use of particular integrated circuits to provide the various functions, but these particular integrated circuits may be replaced by similar integrated circuits of other manufacturers or by discrete components which together perform the same or similar functions. The choices of frequency and of the value of the integer N are also exemplary.

We claim:

1. A recovered clock recovery for deriving a recovered clock signal from a band limited multi-level digital signal, the circuit comprising in combination:
   means responsive to the multi-level digital signal for deriving a marking signal comprising groups of transition markers, each marker corresponding to the crossing by the digital signal of any of a plurality of predetermined threshold levels and adjacent groups of markers being separated by an eye interval during which no transitions take place;
   digital synchronizing means coupld to an output of said means for deriving a marking signal for outputting a digital control signal therefrom; and
   a locally generated signal source having an input for receiving said digital control signal and having a first and second output port, each output port coupled to said digital synchronizing means, with said first output port providing clock pulses for clocking said digital synchronizing means and said second output port providing window pulses substantially synchronized with said eye intervals, thereby providing the recovered clock signal which is relatively immune to drift with time and temperature.

2. A clock recovery circuit as claimed in claim 1 wherein said means for deriving the marking signal includes a plurality of comparators for comparing the multi-level digital signal with any of a plurality of threshold levels and for providing an output level change indicative of the crossing of any of the plurality of threshold levels by the digital signal.

3. A clock recovery circuit as claimed in claim 2 wherein gating means such as an exclusive-OR arrangement is provided for combining outputs of the comparators into a single output.

4. A clock recovery circuit as claimed in claim 1 wherein said locally generated signal source comprises in combination:
   an oscillator whose output signal is coupled to said first output port; and
   a feedback connected shift register coupled to said oscillator first output port to divide the oscillator output signal to produce at said second output port a phase adjustable train of window pulses of predetermined width and having a repetition frequency substantially corresponding to that of said eye intervals.

5. A clock recovery circuit as claimed in claim 1 wherein said digital synchronizing means is a synchronization circuit comprising in combination:
   gating switch means for comparing the window pulses fed from said locally generated signal source with the marking signal and for providing a synchronization indicating output signal therefrom; and
   digital synchronization adjustment means for adjusting the phase of the window pulses by outputting said digital control signal in dependence upon said synchronization indicating output signal from said gating switch said clock pulses from said locally generated signal source means, thereby adjusting the phase of the window pulses from said locally generated signal source.

6. A clock recovery circuit as claimed in claim 5 wherein said digital synchronization adjustment means comprises a flip-flop circuit having an output whose state is set in dependence upon the synchronization indicating output signal and clocked by said clock pulses from said locally generated signal source, the output of the flip-flop circuit being coupled to a digital control signal input of said locally generated signal source.

7. A clock recovery circuit as claimed in claim 1 further comprising smoothing means, such as a phase lock loop circuit provided at the second output port of said locally generated signal source, for smoothing any phase jitter present in the recovered clock signal and for outputting a smoothed clock signal therefrom.

8. A clock recovery circuit as claimed in claim 7 wherein said phase lock loop circuit comprises in combination:
   a controllable oscillator which may include frequency dividers and which provides a smoothed clock signal output therefrom; and
   a phase comparator for comparing the phase of the recovered clock signal with that of the smoothed clock signal to determine if a locking condition exists, and having a low pass filter on its output for providing a control signal for adjusting the frequency of said controllable oscillator.

9. A clock recovery circuit as claimed in claim 8 further comprising means for performing a locking check provided at a second output of said phase comparator for controlling said digital synchronizing means so as to be responsive to the locking condition of the phase lock loop circuit for reducing the width of said window pulses, thereby reducing further any phase jitter present in the recovered clock signal.

10. A recovered clock recovery circuit for deriving a recovered clock signal from a band limited multi-level digital signal, the circuit comprising in combination:
    means responsive to the multi-level digital signal for deriving a marking signal comprising groups of transition markers, each marker corresponding to the crossing by the digital signal of any of a plurality of predetermined threshold levels and adjacent groups of markers being separated by an eye interval during which no transitions take place;
    digital synchronizing means coupled to an output of said means for deriving a marking signal for outputting a digital control signal therefrom;
    a locally generated signal source having an input for receiving said digital control signal and having a first and second output port, each output port coupled to said digital synchronizing means, with said first output port providing clock pulses for clocking said digital synchronizing means, and said second output port providing window pulses substantially synchronized with said eye intervals to provide the recovered clock signal; and smoothing means such as a phase lock loop circuit provided at the second output port of said locally generated signal source for smoothing any phase jitter present in the recovered clock signal and for outputting a smoothed clock signal therefrom which is relatively immune to drift with time and temperature.

11. A clock recovery circuit as claimed in claim 10 wherein said means for deriving the marking signal includes a plurality of comparators for comparing the multi-level digital signal with any of a plurality of threshold levels and for providing an output level change indicative of the crossing of any of the plurality of threshold levels by the digital signal.

12. A clock recovery circuit as claimed in claim 11 wherein gating means such as an exclusive-OR arrangement is provided for combining outputs of the comparators into a single output.

13. A clock recovery circuit as claimed in claim 10 wherein said locally generated signal source comprises in combination:

an oscillator whose output signal is coupled to said first output port; and a feedback connected shift register coupled to said oscillator first output port to divide the oscillator output signal and produce at said second output port a phase adjustable train of window pulses of predetermined width and having a repetition frequency substantially corresponding to that of said eye intervals.

14. A clock recovery circuit as claimed in claim 10 wherein said digital synchronizing means is a synchronization circuit comprising in combination:

gating switch means for comparing the window pulses fed from said locally generated signal source with the marking signal and for providing a synchronization indicating output signal therefrom; and digital synchronization adjustment means for adjusting the phase of the window pulses by outputting said digital control signal in dependence upon said synchronization indicating output signal from said gating switch said clock pulses from said locally generated signal source means, thereby adjusting the phase of the window pulses from said locally generated signal source.

15. A clock recovery circuit as claimed in claim 14 wherein said digital synchronization adjustment means comprises a flip-flop circuit having an output whose state is set in dependence upon the synchronization indicating output signal and clocked by said clock pulses from said locally generated signal source, the output of the flip-flop circuit being coupled to a digital control signal input of said locally generated signal source.

16. A clock recovery circuit according to claim 10 wherein said smoothing means includes a phase lock loop comprising in combination:

a controllable oscillator which may include frequency dividers and which provides a smoothed clock signal output therefrom; and a phase comparator for comparing the phase of the recovered clock signal with that of the smoothed clock signal to determine if a locking condition exists, and having a low pass filter on its output for providing a control signal to adjust the frequency of said controllable oscillator.

17. A clock recovery circuit as claimed in claim 16 further comprising means for performing a locking check provided at a second output of said phase comparator for controlling said digital synchronizing means so as to be responsive to the locking condition of the phase lock loop circuit for reducing the width of said window pulses, thereby reducing further any phase jitter present in the recovered clock signal.

* * * * *